United States Patent
Polizzi

(10) Patent No.: US 7,403,934 B2
(45) Date of Patent: Jul. 22, 2008

(54) SCRIPT GENERATOR FOR AUTOMATING SYSTEM ADMINISTRATION OPERATIONS

(75) Inventor: Nicholas P. Polizzi, St. Charles, MO (US)

(73) Assignee: SBC Properties, L.P., Reno, NV (US)

( * ) Notice: Subject to any disclaimer, the term of this patent is extended or adjusted under 35 U.S.C. 154(b) by 575 days.

(21) Appl. No.: 10/458,466

(22) Filed: Jun. 10, 2003

(65) Prior Publication Data

US 2004/0254914 A1    Dec. 16, 2004

(51) Int. Cl.
    *G06F 17/30*    (2006.01)
(52) U.S. Cl. .................. 707/1; 707/3; 707/4; 707/204
(58) Field of Classification Search .................. 707/1, 707/3, 4, 204; 714/38
    See application file for complete search history.

(56) References Cited

U.S. PATENT DOCUMENTS

| | | | | |
|---|---|---|---|---|
| 6,151,608 A | * | 11/2000 | Abrams | 707/204 |
| 6,421,665 B1 | | 7/2002 | Brye et al. | |
| 6,496,834 B1 | | 12/2002 | Cereghini et al. | |
| 6,714,928 B1 | * | 3/2004 | Calow | 707/4 |
| 6,795,808 B1 | * | 9/2004 | Strubbe et al. | 704/275 |
| 2003/0070119 A1 | * | 4/2003 | Dallin | 714/38 |

OTHER PUBLICATIONS

"Catching up with Clarion"; Tom Spitzer; Jun. 1996; DBMS Magazine; vol. 9, No. 7; pp. 1-10.*

* cited by examiner

*Primary Examiner*—Jeffrey Gaffin
*Assistant Examiner*—Farhan Syed
(74) *Attorney, Agent, or Firm*—Toler Shaffer

(57) ABSTRACT

A script generating system includes a data dictionary adapted to include table structure data. A database management system runs a script generator, which includes a plurality of user defined templates. Activation of the script generator utilizes built-in macros within the database management system and extracts the table structure data. Responsively, one of the templates manipulates the table structure data to generate a script.

15 Claims, 1 Drawing Sheet

SCRIPT GENERATOR FOR AUTOMATING SYSTEM ADMINISTRATION OPERATIONS

TECHNICAL FIELD

The present invention relates generally to script generators, and more particularly, to a script generator for automating system administration operations.

BACKGROUND ART

As is well known, computer scripts, also referred to as macros or batch files, are lists of commands that can be executed without user interaction. A script language is a simple programming language with which a programmer can write scripts. Examples thereof include BASIC, C, C++, COBOL, FORTRAN, ADA, and PASCAL. Each language has a unique set of key words (words that it particularly understands) and a special syntax organizing program instructions. A script generator generates either a complete computer program written in a prescribed programming language or a portion thereof.

Previously, to avoid writing a complete program or a complete script, a programmer would start a project by either reusing some previous code that was similar to the current project request or by going to a repository of standard templates. The programmer then proceeds with the time consuming task of replacing mirrored code with new variables. A single project may take a programmer hours or even days to complete, depending on how much rework must be done on the acquired code.

The disadvantages associated with current script generating techniques have made it apparent that a new technique to generate script in such a manner to minimize required user input, or reworking of previously written code. The new technique should facilitate the writing of code by automatically updating old or previously used code. The present invention is directed to these ends.

SUMMARY OF THE INVENTION

The present invention provides a method for automating system administration operations for use as a script generator. The present invention also provides a system for implementing the script generator.

In accordance with one aspect of the present invention, a script generating system includes a data dictionary adapted to include table structure data. A database management system runs a script generator, which includes a plurality of user defined templates. Activation of the script generator utilizes built-in macros within the database management system and extracts the table structure data. Responsively, one of the templates manipulates the table structure data to generate a script.

In accordance with another aspect of the present invention, a method for generating a script includes running a built-in macro for RDBMS architecture dictionary retrieval, and extracting table structure data from a RDBMS architecture dictionary. The table structure data is then converted into an alternate programming language file layout and arranged within a predefined template. Ultimately, a script is generated from the predefined template.

One advantage of the present invention is that it takes the manual effort of script building, maintenance of database structures and automates it. A further advantage is that the present invention allows programmers to build personalized collections of local templates. Additional advantages and features of the present invention will become apparent from the description that follows and may be realized by the instrumentalities and combinations particularly pointed out in the appended claims, taken in conjunction with the accompanying drawings.

BRIEF DESCRIPTION OF THE DRAWINGS

For a more complete understanding of the present invention, reference will now be made to the embodiments illustrated in greater detail in the accompanying figures and described below by way of examples of the invention wherein.

DETAILED DESCRIPTION

The present invention is illustrated with respect to a script generator for automating system administration operations particularly suited to data management. The present invention is, however, applicable to various other uses that may require system administration operations, as will be understood by one skilled in the art.

Figure 1:
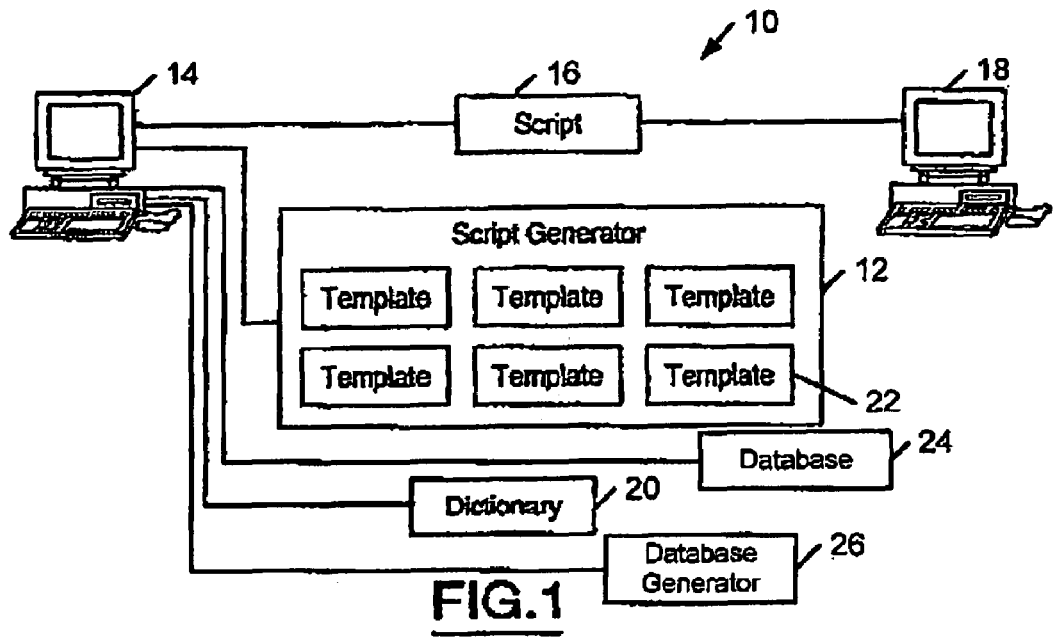
FIG. 1 is a schematic view of the script generator for automating system administration operations in accordance with one embodiment of the present invention.

Referring to FIG. 1, a system for automating system administration operations (script generating system 10), including a script generator 12, is illustrated in accordance with one embodiment of the present invention. The system 10 also includes a host server 14, a database 24, a remote server 18, and a database generator 26, all of which are electrically coupled together.

The host server 14 may include the database 16, the script generator 12, and the database generator 26, or alternately the host server 14 may be a remote unit from any or all of the aforementioned components.

The script generator 12 may be included within the server 14 or alternately included in a separate unit. The script generator 12 includes a number of templates 22. The script generator 12 is designed such that the templates 22 may be edited, deleted, or stored in a different of permanent storage unit. The script generator 12 ideally runs on a relational database management system (RDBMS) or database management system (DBMS), and may incorporate data architectures, such as Teradata.

The script generator 12 includes Teradata in one embodiment of the present invention. Teradata is a database management system (DBMS) created by NCR Corporation. It includes both custom hardware and custom software. A Teradata DBMS is useful because it can handle more than 1 terabyte of data, which is why it is used a lot in very large scale data warehousing applications. Essentially, Teradata is a parallel architecture used to efficiently store, retrieve, and process large volumes of data.

The script generator 12 may include a DBMS, which is a computer program (or more typically, a suite of them) designed to manage a database, a large set of structured data, and run operations on the data requested by numerous users. Typical examples of DBMS uses include: accounting, human resources, and customer support systems. An alternate embodiment of the present invention includes an RDBMS, which is a type of DBMS that stores data in the form of related tables.

The templates 22 are stored within the script generator 12. Examples of the templates 22 include an auto load feature to auto load a specific file, a create duplicate copy from a dictionary table layout to generate a backup copy for editing of either the original or the duplicate, a multi-load delete to include a delete that works off a separate file whereby a parallel connection between the two files can result in a parallel deletion of data within the files, a template for collecting statistics on columns and upfront optimizations, a template with a syntax that purges data from a table or other template thereby allowing two templates to link together, a template including the secondary index that allows storing of data on a table or removing data on a table for a separate fast load procedure then reincorporating the data, a template to replace or update the template with a new template, and a template to clean or filter out data. Important to note is that numerous other templates may be designed and incorporated in a system embodied herein.

These templates 22 generate error-free scripts for an infinite number of table structures by incorporating and manipulating dictionary information from the dictionary 20. The script generator 12 also allows users at remote servers 18 to download the templates 22 and generate new templates or user-defined templates using predefined variables, such as the ones used in the templates 22. The templates 22 may also call other templates into die templates 22 as variables, thereby allowing the user to quickly assemble repetitive, complex script logic solely from dictionary information.

The database dictionary 20, which may be a Teradata data dictionary, as most other RDBMS architectures are, holds information regarding table structures (i.e. column names, data types, formatting, default values, primary index, secondary index, column statistics, views, etc.). By utilizing built-in macros for dictionary retrieval, dictionary information can be obtained instantly on all table structures. Once retrieved, this dictionary information is then manipulated using the aforementioned predefined templates 22 to generate error-free scripts 16.

In one embodiment of the present invention, the remote server 18 receives information from the database 24, and a user applies the database information to various programs, such as inventory reports. In an alternate embodiment, the user designs templates on the remote server 18 and extracts dictionary information for use in the templates. The remote server 18 may include an alternate script generator or may be linked to the script generator 12.

Figure 2:
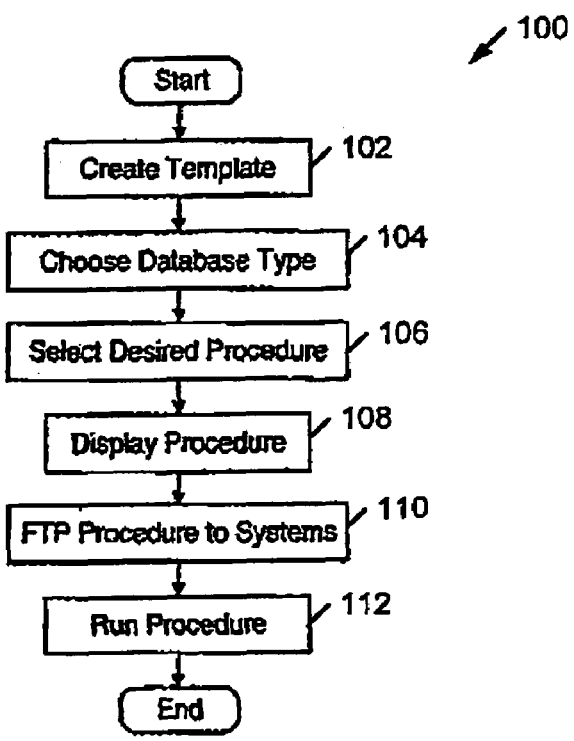
FIG. 2 is a logic flow diagram of a method for automating system administration operations in accordance with another embodiment of the present invention.

Referring to FIG. 2, a logic flow diagram of a method 100 for automating system administration operations is illustrated. Logic starts in operation block 102 where a programmer creates templates 22 using information from the database dictionary 20.

In operation block 104, either the programmer or a user at a remote server 18 chooses the database type with which to run one of the templates 22. In operation block 106, the desired procedure is selected, and various templates 22 for implementing the procedure are incorporated within the procedure script.

In operation block 108, the procedure is displayed in its entirety. In operation block 110, the procedure is FTP (file transfer protocol) to various systems requiring the procedure or aspects of the procedure. In operation 112, the procedure is run on either the server 14 or a remote server 18.

In operation, the method for generating a script 16 includes running a built-in macro for RDBMS architecture dictionary retrieval, and extracting table structure data from a RDBMS architecture dictionary 20. The table structure data is then converted into an alternate programming language file layout, such as COBOL, and arranged within a predefined template 22. Ultimately, a script is generated from the predefined template 22.

From the foregoing, it can be seen that there has been brought to the art a new script generating system 10. It is to be understood that the preceding descriptions of various embodiments are merely illustrative of some of the many specific embodiments that represent applications of the principles of the present invention. Numerous and other arrangements would be evident to those skilled in the art without departing from the scope of the invention as defined by the following claims.

The invention claimed is:

1. A method for generating a script comprising:
   receiving data from a user indicating a selection of a procedure; and in response to receiving the data:
      automatically extracting table structure information from a database management system dictionary of a database management system;
      manipulating the extracted table structure information before generating the script;
      automatically selecting a plurality of templates to implement the procedure, wherein at least one of the plurality of templates is created by the user;
      automatically incorporating the table structure information into the plurality of templates;
      automatically generating the script to implement the procedure using the plurality of templates; and
      automatically arranging table structure information within at least one template of the plurality of templates and presenting the at least one template with the table structure information to the user for manual selection of a particular template to implement the procedure.

2. The method of claim 1, wherein extracting table structure information from the database management system dictionary comprises retrieving the database management system dictionary from the database management system.

3. The method of claim 1, wherein extracting table structure information from the database management system dictionary comprises executing one or more macros to extract the table structure information from the database management system dictionary.

4. The method of claim 1, further comprising converting the table structure information into a programming language file layout before incorporating the table structure information into the plurality of templates.

5. The method of claim 1, wherein generating the script includes calling a first template of the plurality of templates into a second template of the plurality of templates as a variable.

6. The method of claim 1, wherein the database management system comprises a parallel architecture.

7. The method of claim 1, further comprising displaying the script.

8. The method of claim 1, wherein the script is generated in the COBOL programming language.

9. A script generating system comprising: a server having logic adapted to receive data indicating a selection of a procedure;
   wherein, in response to receiving the data, the logic is adapted to:
      automatically extract table structure data from a database management system dictionary via at least one macro;
      present a portion of the extracted table structure data to a use for manipulation before generating a script;

automatically select a plurality of templates to implement the procedure;

automatically incorporate the extracted table structure data into one or more templates of the plurality of templates;

and automatically generate the script using the plurality of templates, wherein the logic is adapted to automatically arrange table structure data within at least one template of the plurality of templates and present the at least one template with the table structure data to a user for manual selection of a particular template to implement the procedure.

10. The system of claim 9, wherein the at least one macro retrieves the database management system dictionary from a database management system to extract the table structure data.

11. The system of claim 10, wherein the database management system comprises a parallel architecture.

12. The system of claim 9, wherein the table structure data includes column name, data types, formatting, default values, primary index, second index, column statistics, views, or any combination thereof.

13. The system of claim 9, wherein the logic is adapted to call a first template of the plurality of templates into a second template of the plurality of templates as a variable.

14. The system of claim 9, wherein the logic is adapted to convert the table structure data into a programming language file layout before incorporating the table structure data into the plurality of templates.

15. The system of claim 14, wherein the programming language file layout is for the COBOL programming language.

* * * * *